(12) United States Patent
Jang et al.

(10) Patent No.: US 10,190,250 B2
(45) Date of Patent: Jan. 29, 2019

(54) DRIVING APPARATUS FOR WASHING MACHINE

(71) Applicant: NEW MOTECH CO., LTD., Gwangju (KR)

(72) Inventors: Jeong Cheol Jang, Gwangju (KR); Ji Min Lee, Gwangju (KR); Gyeong Sik Yang, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 6 days.

(21) Appl. No.: 15/538,197

(22) PCT Filed: Jan. 15, 2016

(86) PCT No.: PCT/KR2016/000427
§ 371 (c)(1),
(2) Date: Jun. 21, 2017

(87) PCT Pub. No.: WO2016/153160
PCT Pub. Date: Sep. 29, 2016

(65) Prior Publication Data
US 2017/0342630 A1 Nov. 30, 2017

(30) Foreign Application Priority Data
Mar. 25, 2015 (KR) .......................... 10-2015-0041421

(51) Int. Cl.
*D06F 37/30* (2006.01)
*D06F 37/40* (2006.01)
(Continued)

(52) U.S. Cl.
CPC .............. *D06F 37/30* (2013.01); *D06F 37/40* (2013.01); *H02K 7/10* (2013.01); *H02K 7/108* (2013.01); *H02K 7/112* (2013.01)

(58) Field of Classification Search
CPC .......... D06F 37/30; D06F 37/40; D06F 33/02; D06F 2202/12; H02K 7/112; H02K 7/10; H02K 7/108
See application file for complete search history.

(56) References Cited

U.S. PATENT DOCUMENTS

| 2011/0023239 A1* | 2/2011 | Lee ....................... D06F 35/005 8/137 |
| 2013/0199247 A1 | 8/2013 | Lee et al. |

(Continued)

FOREIGN PATENT DOCUMENTS

| JP | 2001-340685 A | 12/2001 |
| KR | 10-2013-0090164 A | 8/2013 |

(Continued)

OTHER PUBLICATIONS

International Search Report for PCT/KR2016/000427 dated Apr. 6, 2016 from Korean Intellectual Property Office.

*Primary Examiner* — Joseph L. Perrin
(74) *Attorney, Agent, or Firm* — Revolution IP, PLLC

(57) ABSTRACT

The driving apparatus for a washing machine according to the present invention includes a clutch housing including a washing shaft and a dewatering shaft penetrating the inside; an annular clutch holder installed in the lower part of the clutch housing; a clutch lever hinge-coupled to the clutch holder, including an upper rotation part and a coupler receiving part; a driving lever having a lever arm interlocking with the upper rotation part of the clutch lever; a clutch coupler laid on the upper part of the coupler receiving part performing up and down spline movement by the coupler receiving part; and a motor assembly coupled to the lower part of the clutch holder, including a stator assembly and a rotor assembly.

4 Claims, 4 Drawing Sheets

(51) Int. Cl.
   *H02K 7/10* (2006.01)
   *H02K 7/108* (2006.01)
   *H02K 7/112* (2006.01)

(56) References Cited

U.S. PATENT DOCUMENTS

2015/0214807 A1   7/2015  Jang et al.
2016/0010265 A1   1/2016  Jang et al.
2016/0355967 A1*  12/2016  Kim .................. D06F 37/40

FOREIGN PATENT DOCUMENTS

KR      10-1363227 B1     2/2014
KR    10-2014-0130353 A   11/2014
KR    10-2015-0017430 A   2/2015
WO    WO 2014/042340 A1 * 3/2014

* cited by examiner

[Fig. 1]
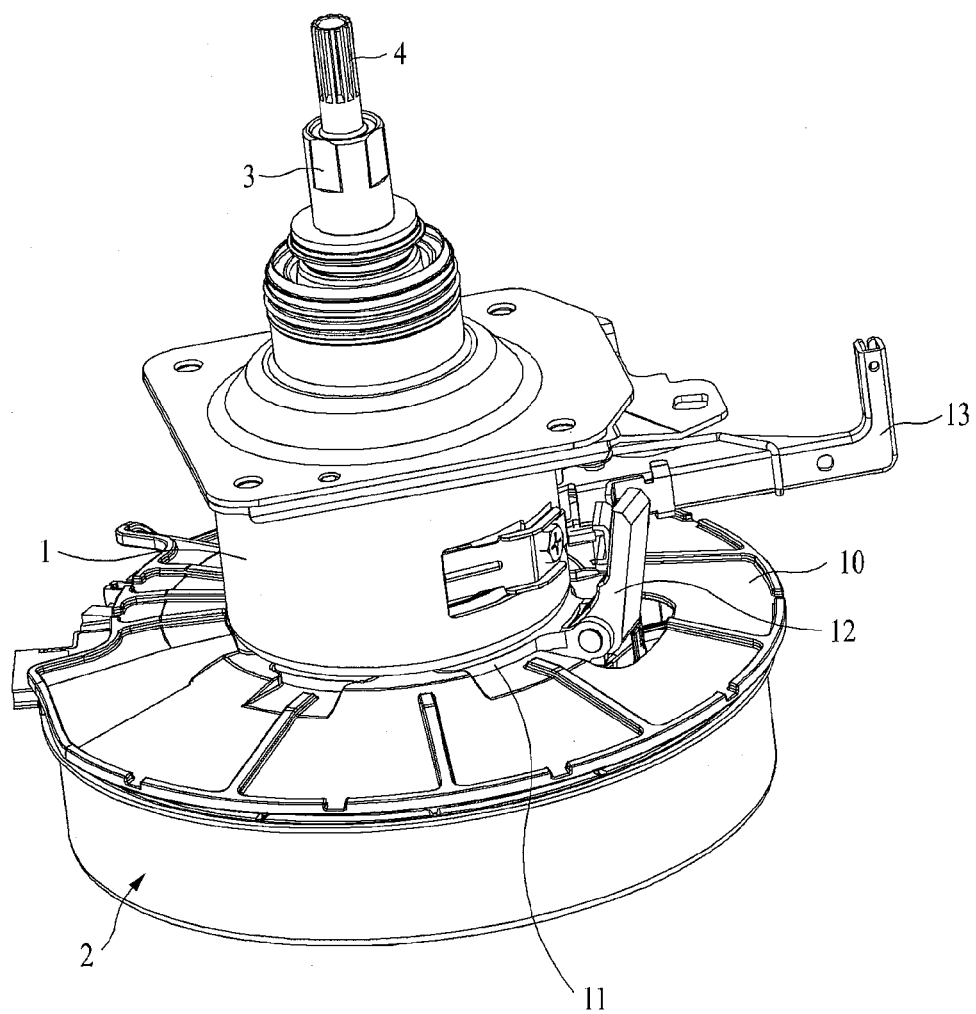

[Fig. 2]
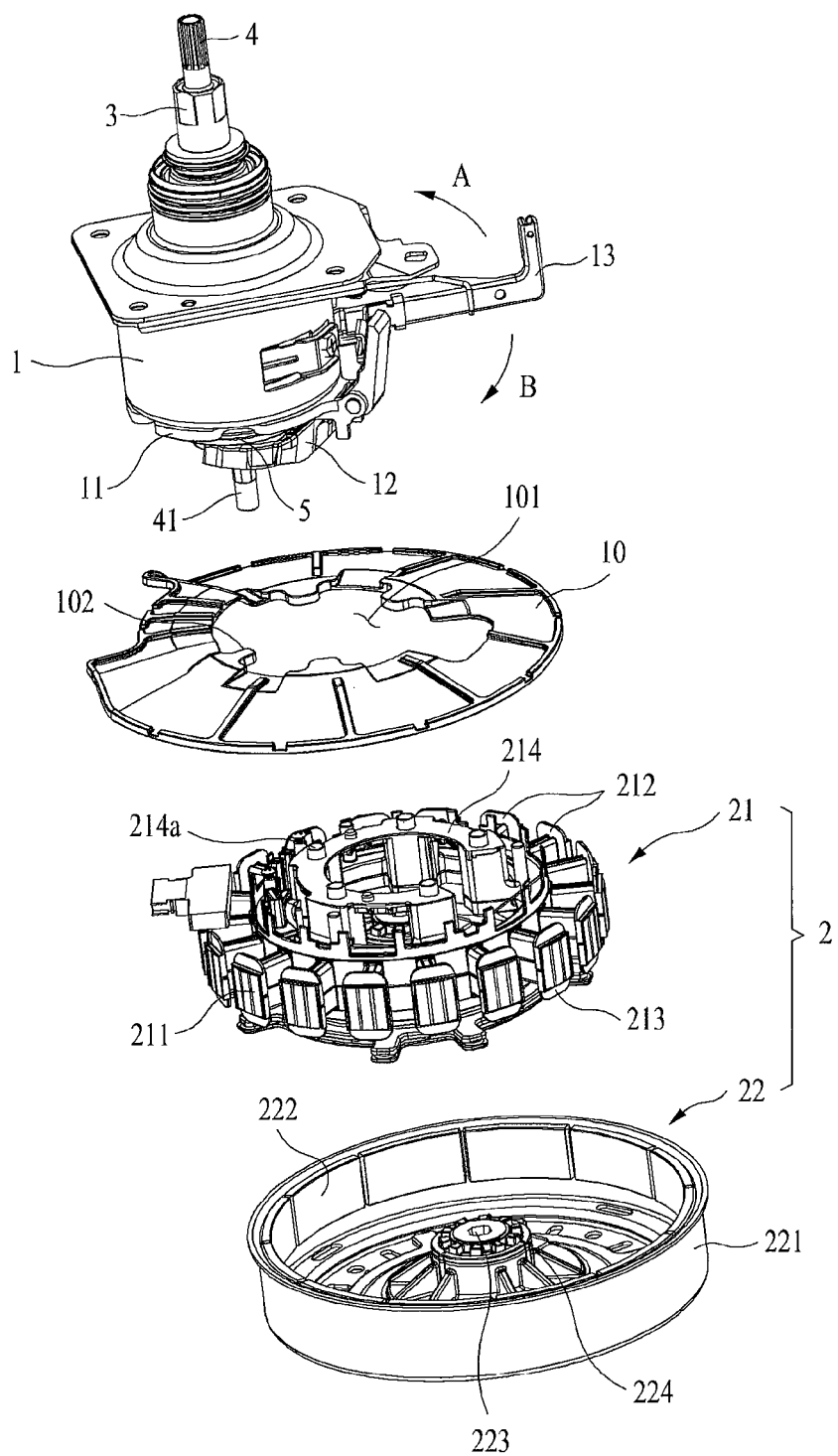

[Fig. 3]
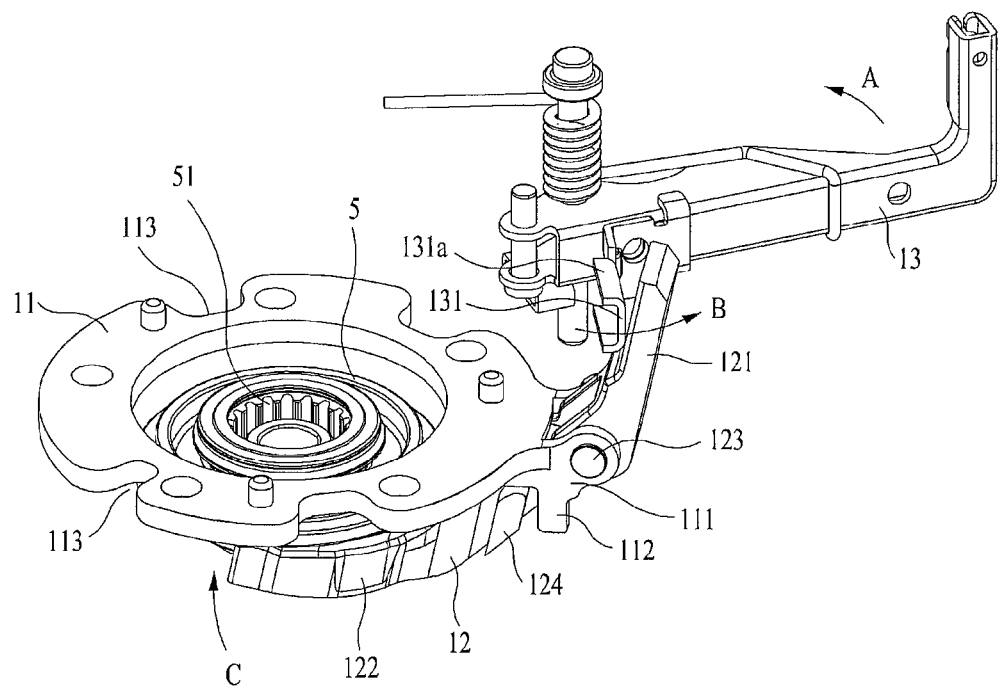

[Fig. 4]
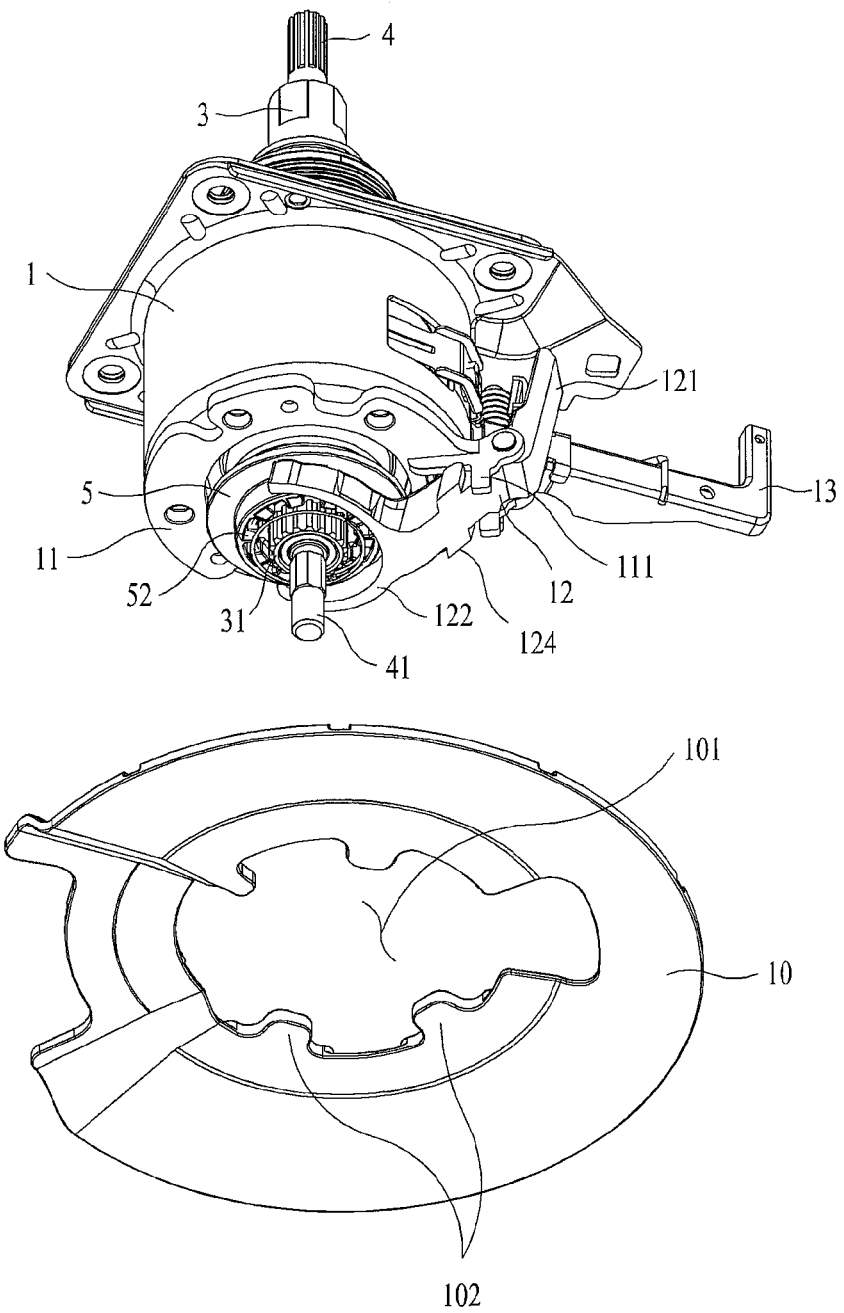

DRIVING APPARATUS FOR WASHING MACHINE

CROSS REFERENCE TO PRIOR APPLICATIONS

This application is a National Stage Application of PCT International Patent Application No. PCT/KR2016/000427 filed on Jan. 15, 2016, under 35 U.S.C. § 371, which claims priority to Korean Patent Application No. 10-2015-0041421 filed on Mar. 25, 2015, which are all hereby incorporated by reference in their entirety.

TECHNICAL FIELD

The present invention relates to a driving apparatus for a washing machine. More specifically, the present invention relates to a driving apparatus for a washing machine with a structure capable of operating a clutch lever more efficiently, and preventing direct penetration of water into the upper part of a motor assembly.

BACKGROUND ART

In general, washing machines are household appliances for removing pollutants on clothes or bedding by using friction and impact, etc. of water current accompanied by the emulsification of detergents and the rotation of washing wings. The conventional washing machine performs washing and dewatering by going through the process of washing, rinsing, dewatering, etc.

Such washing machines may be classified into pulsator type washing machines and drum type washing machines according to the washing method. Among them, the pulsator type washing machine performs washing or rinsing by creating a water current by rotating only the washing wings, i.e., pulsators, without moving the washing tub while performing washing and rinsing. When performing dewatering, dewatering is performed by separating water from the laundry contained in the washing tub by a centrifugal force by rotating the washing wings together with the washing tub.

To this end, the general pulsator type washing machine includes a washing shaft for rotating washing wings, a dewatering shaft for rotating a washing tub, and a clutch device for selectively delivering driving force of the motor to the washing shaft and dewatering shaft according to the process of washing or dewatering.

Korean Patent Laid-Open No. 10-2014-0130353 discloses that a coupling lever rotates when a clutch lever operates in order to selectively deliver the driving force of the motor to the washing shaft and dewatering shaft, and this coupling lever plays the role of delivering or blocking the rotation of the motor to or from the dewatering shaft by operating a clutch coupling up and down. Here, the operation of the clutch lever and coupling lever are limited by a first stopper and a second stopper. In this regard, it is somewhat unstable to limit the operation range of the clutch coupling in cooperation with the first and second stoppers formed in the two levers in terms of interlocking the operation of the two levers with the clutch coupling. Further, water may fall from the washing tub to the upper part of the motor, and the water falling may cause the motor to break down by directly penetrating to the inside from the upper part of the motor.

In this regard, in order to solve the above problems, the present inventors aim to suggest a driving apparatus for a washing machine of a new structure with a new lever rotation structure capable of effectively preventing water falling from the upper part of the motor from penetrating into the motor.

DISCLOSURE OF INVENTION

Technical Problem

It is an object of the present invention to provide a driving apparatus for a washing machine with a new rotation structure of two levers for efficiently operating the clutch of the washing machine.

It is another object of the present invention to provide a driving apparatus for a washing machine with a structure capable of preventing water falling from the washing tub from directly penetrating into the motor.

The above objects and other objects implied therein may be easily achieved by the present invention explained in the following.

Solution to Problem

The driving apparatus for the washing machine according to the present invention includes: a clutch housing including a washing shaft and a dewatering shaft penetrating the inside; an annular clutch holder installed in the lower part of the clutch housing; a clutch lever hinge-coupled to the clutch holder, including an upper rotation part and a coupler receiving part; a driving lever having a lever arm interlocking with the upper rotation part of the clutch lever; a clutch coupler laid on the upper part of the coupler receiving part performing up and down spline movement by the coupler receiving part; and a motor assembly coupled to the lower part of the clutch holder, including a stator assembly and a rotor assembly.

In the present invention, the driving apparatus further includes a waterproof cover covering the upper part of the motor assembly, wherein the waterproof cover includes a cavity formed in the inside, and at least one coupling protrusion formed being protruded towards the inside of the cavity, and wherein at least one waterproof cover coupling hole is formed in the clutch holder so that the waterproof cover may be coupled to the lower part of the clutch housing by coupling the coupling protrusion with the waterproof cover coupling hole.

In the present invention, a clutch stopper formed being protruded in the clutch holder may be formed.

In the present invention, a stopper protrusion limiting the rotation range of the clutch lever may be formed in the coupler receiving part by being latched to the clutch stopper.

In the present invention, a stopper protrusion limiting the rotation range of the clutch lever may be formed in the upper rotation part by being latched to the clutch stopper.

Advantageous Effects of Invention

The present invention has an effect of providing a driving apparatus for a washing machine capable of operating a clutch lever more efficiently by the new rotation structure of two levers for operating a clutch of the washing machine, and preventing water falling from a washing tub from directly penetrating into the inside of a motor.

BRIEF DESCRIPTION OF DRAWINGS

FIG. 1 is a perspective view illustrating a driving apparatus for a washing machine according to the present invention;

FIG. 2 is an exploded perspective view illustrating a driving apparatus for a washing machine according to the present invention;

FIG. 3 is a perspective view illustrating a coupling structure of a driving lever, clutch lever, and clutch coupler of a driving apparatus for a washing machine according to the present invention; and FIG. 4 is a perspective view seen from the bottom of a condition removing a motor assembly from a driving apparatus for a washing machine according to the present invention.

Hereinafter, the present invention will be explained in more detail with reference to the accompanying drawings.

BEST MODE FOR CARRYING OUT THE INVENTION

FIG. 1 is a perspective view illustrating a driving apparatus for a washing machine according to the present invention. FIG. 2 is an exploded perspective view illustrating a driving apparatus for a washing machine according to the present invention.

As illustrated in FIG. 1 and FIG. 2, the driving apparatus for the washing machine according to the present invention includes a clutch housing 1, a motor assembly 2, a dewatering shaft 3 and a washing shaft 4.

The clutch housing 1 has the dewatering shaft 3 and the washing shaft 4 penetrating its center part. A gear set (not shown) that may rotate a washing tub by providing a large torque to the dewatering shaft 3 may be included inside the clutch housing 1. Also, a brake drum (not shown) may be installed inside the clutch housing 1 according to the type of driving apparatus or as needed. In this case, a driving lever 13 installed in one side of the clutch housing 1 may operate the brake drum. As the inner structure of the clutch housing 1, a person having ordinary skill in the art may adopt and apply an appropriate structure as needed.

A waterproof cover 10 and a clutch holder 11 are coupled to the lower part of the clutch housing 1. The waterproof cover 10 is coupled to the lower part of the clutch housing 1 by directly being coupled to the clutch holder 11. Its detailed structure will be explained again in the following.

The clutch holder 11 is coupled to the lower part of the clutch housing 1, and has an annular ring shape. A clutch lever 12 is hinge-coupled to the clutch holder 11 so as to be capable of rotation. The driving lever 13 is installed in the upper part of the clutch lever 12, so that the clutch lever 12 rotates by the operation of the driving lever 13. When the driving lever 13 operates in direction A in FIG. 2, the upper part of the clutch lever 12 is bent back and it rotates with respect to the hinge point. In this case, a clutch coupler 5 placed on the lower part of the clutch lever 12 moves to the upper part. Since a spring (not shown) is installed in the upper part of the clutch coupler 5, a force allowing the clutch coupler 5 to move downward is always applied to the clutch coupler 5. Thus, when the driving lever 13 operates in direction B, the clutch lever 12 rotates so that the clutch coupler 5 moves to the upper part.

As illustrated in FIG. 2, the motor assembly 2 of the present invention includes a stator assembly 21 and a rotor assembly 22. The stator assembly includes a stator core 211, and an upper insulator 212 and a lower insulator 212 respectively coupled to the upper part and lower part of the stator core 211. A clutch mounting part 214 may be formed being protruded upward in the center part of the upper insulator 212. The motor assembly 2 is coupled to the lower part of the clutch housing 1 by coupling a plurality of bolts (not shown) penetrating the clutch mounting part 214 to each hole (not shown) formed in the lower part of the clutch holder 11 and the clutch housing 1. In order to assist the coupling of the clutch housing 1 and the motor assembly 2, or to arrange the location of the coupling, a plurality of arrangement protrusions 214a are formed in the mounting part 214. Also, arrangement holes (not shown) are formed in the lower part of the clutch housing corresponding to the arrangement protrusion 214a, so that arrangement protrusions 214a may be inserted into the arrangement holes.

The rotor assembly 22 includes a rotor housing 221 in the form of a cup, a plurality of magnets 222 attached to the inner wall of the rotor housing 221, a shaft coupling hole 223 formed in the center part of the rotor housing 221 and coupled to a shaft 41, and a rotor spline 224 formed around the shaft coupling hole 223 and coupled to the external spline 52 formed in the lower part of the clutch coupler 5 in the form of a spline. The operation by spline coupling of the clutch coupler 5 will be explained in more detail with reference to FIG. 3 and FIG. 4 in the following.

FIG. 3 is a perspective view illustrating a coupling structure of the driving lever, clutch lever, and clutch coupler of the driving apparatus for a washing machine according to the present invention. FIG. 4 is a perspective view seen from the bottom of a condition removing the motor assembly from the driving apparatus for the washing machine according to the present invention.

Referring to FIG. 3 and FIG. 4, a clutch holder 11 is a ring shape member coupled to the lower part of the clutch housing 1. One side of the clutch holder 11 has a hinge coupling part 111. In this regard, the hinge protrusion 123 of a clutch lever 12 is coupled to the hinge coupling part 111 so that the clutch lever 12 can rotate with respect to the hinge protrusion 123. A clutch stopper 112 formed being protruded downwardly is included in the lower part of the hinge coupling part 111. The clutch stopper 112 plays the role of limiting the range of hinge movement, i.e., range of rotation of the clutch lever 12. The range of rotation of the clutch lever 12 is limited by having the hinge protrusion 123 formed in the clutch lever 12 latched to the clutch stopper 112. As illustrated in FIG. 3, the clutch stopper 112 may be formed in the lower part of the hinge coupling part 111, or it may be formed being protruded in the lower part of the clutch holder 11. As another embodiment, the clutch stopper 112 may be formed to be protruded to the upper part of the hinge coupling part 111, and the stopper protrusion 123 may be formed in the lower part of the upper rotation part 121 of the clutch lever 12. In this case, the clutch stopper 112 may be formed in the clutch holder 11, not the hinge coupling part 111.

At least one waterproof cover coupling hole 113 may be formed in the outer or inner circumference of the clutch holder 11. At least one coupling protrusion 102 formed being protruded toward the center part is coupled to the waterproof cover coupling hole 113 along the inner circumference of the cavity 101 of the waterproof cover 10. The size and shape of the waterproof cover coupling hole 113 may be formed to correspond to the size and shape of the coupling protrusion 102 so that they are coupled to each other in a forcibly press-inserting manner. Accordingly, the waterproof cover 10 may be coupled to the lower part of the clutch housing 1. The waterproof cover 10 may be configured to be coupled to the upper part of the stator assembly 21 of the motor assembly 2. However, in this case, the waterproof cover has to be applied when manufacturing the motor assembly 2, and thus the manufacturing process of the motor assembly 2 increases. Also, when selectively applying the waterproof cover 10, i.e., when the waterproof cover 10 is not applied, the waterproof cover installed should be removed from the motor assembly 2, and this bothers the versatility of the motor. Thus, it is advantageous to directly couple the waterproof cover 10 with the clutch housing 1 in terms of manufacturing process or versatility of the motor.

The clutch lever 12 has an upper rotation part 121 and a coupler receiving part 122 having a shape that can lift up the clutch coupler 122 from the lower part of the upper rotation part 121. The structure of the coupler receiving part 122 may have a "C" shape as shown in FIG. 3, but is not necessarily limited to this shape. Various structures allowing the clutch coupler 122 to perform up and down spline movement may be applied.

A hinge protrusion 123 may be formed between the upper rotation part 121 of the clutch lever 12 and the coupler receiving part 122, and a stopper protrusion 124 may be formed in the upper part or lower part of the hinge protrusion 123. The clutch lever may perform rotation movement with respect to the hinge protrusion 123. The upper rotation part 121 of the clutch lever 12 operates in contact with a lever arm 131 of the driving lever 13. As illustrated in FIG. 3, the lever arm 131 is located inside the upper rotation part 121. Preferably, the lever arm 131 has a reinforcing rib 131a whose upper part and lower part are bent inwardly to have good reinforcement strength. As such, in the present invention, the stopper protrusion 124 is formed in the upper part or lower part of the hinge protrusion 123, and the stopper protrusion 124 is latched to the clutch stopper 112 formed in the clutch holder 11 while moving with the rotation of the clutch lever 12, so as to limit the rotation distance of the stopper protrusion 124. This structure may limit the rotation range of the clutch lever 12 and the driving lever 13 through a more stable and simpler structure. In the attached drawings, the clutch stopper 112 and the stopper protrusion 124 are formed in pairs. However, they do not necessarily have to be formed in pairs, and they may be formed only in one side as needed in design.

The driving lever 13 operates in direction A illustrated in FIG. 3 or in an opposite direction. No separate apparatus for driving is illustrated, and an apparatus for operating the driving lever 13 may be properly selected and applied according to the specification of the washing machine, etc. by a person having ordinary skill in the art. The drawing illustrated in FIG. 3 illustrates a condition where the driving lever 13 already operated in direction A. When the driving lever 13 operates in direction A, the lever arm 131 operates in direction B, allowing the upper rotation part 121 of the clutch lever 12 to move to the outside. Since the clutch lever 12 rotates with respect to the center of the hinge protrusion 123, when the upper rotation part 121 is driven to the outside, the coupler receiving part 122 rotates in direction C. The rotation of the coupling receiving part 122 moves the clutch coupler 5 placed thereon. That is, when the coupler receiving part 122 rotates in direction C, the clutch coupler 5 moves to the upper part. When the clutch coupler 5 moves to the upper part, the external spline 52 formed in the lower part of the clutch coupler 5 is separated from the rotor spline 224 formed in the center part of the rotor housing 211, allowing the clutch coupler 5 to be in a non-rotating state even when the rotor housing 221 rotates together with the rotation shaft 41. Thus, the rotation shaft 41 rotates in washing or rinsing mode where only the dewatering shaft 3 rotates.

In order to be in dewatering mode where the dewatering shaft 3 rotates together with the washing shaft 4, the driving lever 13 should operate in opposite direction of direction A. When the driving lever 13 operates in opposite direction of direction A, the lever arm 131 moves in opposite direction of direction B, i.e., in inner direction, and rotates in the same direction as the upper rotation part 121 of the clutch lever 12. Accordingly, the coupler receiving part 122 rotates in opposite direction of direction C, and the clutch coupler 5 descends. Since a spring (not shown) is installed in the upper part of the clutch coupler 5, a force allowing the clutch coupler 5 to move downward is always applied to the clutch coupler 5. When the clutch coupler 5 moves to the lower part, the external spline 52 formed in the lower part of the clutch coupler 5 is engaged with the rotor spline 224 formed in the center part of the rotor housing 221. Thus, the rotor housing 221 rotates together with the clutch coupler 5. In this case, since the inner spline 51 of the clutch coupler 5 is still in a state engaged with the dewatering shaft spline 31 of the lower part of the washing shaft, the dewatering shaft 4 rotates together by the rotation of the clutch coupler 5.

The waterproof cover 10 of the present invention has a cavity 101 in the center part, and has a shape having a lower inclination from the cavity 101 towards the outside. Thus, water falling to the upper part of the waterproof cover 10 flows outside the motor assembly 2, allowing good drainage. There is no particular limitation on the material of the waterproof cover 10, but preferably a water resistant or moisture resistant resin material is used. It is preferable to facilitate coupling and separation by having flexibility.

It should be understood that the detailed description of the present invention explained in the above is for illustrative purpose, not for limiting the scope of the present invention. The scope of the present invention is defined by the appended claims, and all changes and modifications thereto are to be understood as included within the scope of the present invention as defined by the appended claims unless they depart therefrom.

The invention claimed is:

1. A driving apparatus for a washing machine, comprising:
   a clutch housing comprising a washing shaft and a dewatering shaft penetrating the inside;
   an annular clutch holder installed in the lower part of the clutch housing;
   a clutch lever hinge-coupled to the clutch holder, including an upper rotation part and a coupler receiving part;
   a driving lever having a lever arm interlocking with the upper rotation part of the clutch lever;
   a clutch coupler laid on the upper part of the coupler receiving part performing up and down spline movement by the coupler receiving part;
   a motor assembly coupled to the lower part of the clutch holder, comprising a stator assembly and a rotor assembly; and
   a waterproof cover covering the upper part of the motor assembly;
   wherein the waterproof cover comprises a cavity formed in the inside, and at least one coupling protrusion formed being protruded towards the inside of the cavity,
   wherein at least one waterproof cover coupling hole is formed in the clutch holder so that the waterproof cover is coupled to the lower part of the clutch housing by coupling the coupling protrusion with the waterproof cover coupling hole.

2. The driving apparatus of claim 1, wherein a clutch stopper is protruded in the clutch holder.

3. The driving apparatus of claim 2, wherein a stopper protrusion limiting the rotation range of the clutch lever is formed in the coupler receiving part by being latched to the clutch stopper.

4. The driving apparatus of claim 2, wherein a stopper protrusion limiting the rotation range of the clutch lever is formed in the upper rotation part by being latched to the clutch stopper.

* * * * *